United States Patent
Ozawa

(10) Patent No.: US 11,827,798 B2
(45) Date of Patent: Nov. 28, 2023

(54) INK-JET INK

(71) Applicant: KYOCERA Document Solutions Inc., Osaka (JP)

(72) Inventor: Noriaki Ozawa, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 284 days.

(21) Appl. No.: 17/152,888

(22) Filed: Jan. 20, 2021

(65) Prior Publication Data
US 2021/0222021 A1    Jul. 22, 2021

(30) Foreign Application Priority Data

Jan. 21, 2020  (JP) ................... 2020-007596

(51) Int. Cl.
| C09D 11/38 | (2014.01) |
| C09D 11/107 | (2014.01) |
| C09D 11/322 | (2014.01) |
| C08K 5/053 | (2006.01) |

(52) U.S. Cl.
CPC ........... *C09D 11/38* (2013.01); *C09D 11/107* (2013.01); *C09D 11/322* (2013.01); *C08K 5/053* (2013.01)

(58) Field of Classification Search
CPC ..... C09D 11/38; C09D 11/107; C09D 11/322; C08K 5/053
See application file for complete search history.

(56) References Cited

U.S. PATENT DOCUMENTS

| 2003/0195274 A1* | 10/2003 | Nakamura | C09D 5/00 523/160 |
| 2009/0056993 A1* | 3/2009 | Satou | H05K 1/00 174/258 |
| 2013/0155143 A1* | 6/2013 | Ozawa | C09D 7/12 |

FOREIGN PATENT DOCUMENTS

| JP | 2011012253 A | * | 1/2011 | ................ C08F 2/22 |
| WO | 2013/133418 | | 9/2013 | |

OTHER PUBLICATIONS

JP2011012253A English Translation (Year: 2011).*

* cited by examiner

*Primary Examiner* — Ling Siu Choi
*Assistant Examiner* — Huihong Qiao
(74) *Attorney, Agent, or Firm* — LEX IP MEISTER, PLLC

(57) ABSTRACT

An ink-jet ink includes pigment particles; a binder resin; and a penetrant. The binder resin includes a self-emulsification specific resin. The specific resin includes a first repeating unit derived from specific alkyl ester (meth)acrylate including a straight-chain alkyl group having 9 or more and 15 or less carbon atoms. In the specific resin, a content ratio of the first repeating unit is 6.0% by mass or more and 20.0% by mass or less. The penetrant includes specific alkanediol having 6 or more and 8 or less carbon atoms.

5 Claims, No Drawings

INK-JET INK

INCORPORATION BY REFERENCE

This application is based upon, and claims the benefit of priority from, corresponding Japanese Patent Application No. 2020-007596 filed in the Japan Patent Office on Jan. 21, 2020, the entire contents of which are incorporated herein by reference.

BACKGROUND

Field of the Invention

The present disclosure relates to an ink-jet ink.

Description of Related Art

In recent years, ink-jet recording systems have made rapid progress. For example, when photo paper is used as a recording medium, an ink-jet recording system may form high-quality images that are comparable to silver halide photography.

Ink-jet recording systems, however, tend to have lower abrasion resistance of formed images as compared with image forming apparatuses for analog printing and electrophotography. This is because the content ratio of a resin in the ink-jet ink used in the ink-jet recording system is relatively low.

Therefore, there is a demand for an ink-jet ink with which images having desirable abrasion resistance may be formed. In response to such a demand, for example, an ink-jet ink using a resin emulsion has been proposed.

SUMMARY

An ink-jet ink according to the present disclosure includes pigment particles; a binder resin; and a penetrant. The binder resin includes a self-emulsification specific resin. The specific resin includes a first repeating unit derived from specific alkyl ester (meth)acrylate including a straight-chain alkyl group having 9 or more and 15 or less carbon atoms. In the specific resin, a content ratio of the first repeating unit is 6.0% by mass or more and 20.0% by mass or less. The penetrant includes specific alkanediol having 6 or more and 8 or less carbon atoms.

DETAILED DESCRIPTION

Embodiments of the present disclosure are described below. In the following description, a measured value of the volume median diameter (D50) is a value measured by using a dynamic light-scattering particle diameter distribution measurement device ("Zetasizer Nano ZS" manufactured by Sysmex Corporation) unless otherwise specified.

In the following description, a measured acid value is a value measured according to "JIS (Japanese Industrial Standards) K0070-1992" unless otherwise specified. A measured value of a mass-average molecular weight (Mw) is a value measured by using gel permeation chromatography unless otherwise specified.

In this description, acrylic and methacrylic may be collectively referred to as "(meth)acrylic".

<Ink>

An ink-jet ink (hereinafter sometimes simply referred to as ink) according to the present disclosure is described below. The ink according to the present disclosure includes pigment particles, a binder resin, and a penetrant. The binder resin includes a self-emulsification specific resin. The specific resin includes a first repeating unit derived from specific alkyl ester (meth)acrylate including a straight-chain alkyl group having 9 or more and 15 or less carbon atoms. In the specified resin, the content ratio of the first repeating unit is 6.0% by mass or more and 20.0% by mass or less. The penetrant includes specific alkanediol having 6 or more and 8 or less carbon atoms.

The self-emulsification resin refers to a resin that emulsifies with a solvent (e.g., water) even in the absence of a dispersant. A self-emulsification resin has a soluble group on its surface. Examples of the soluble group include a glycidyl group, a hydroxy group, an anionic group, and a cationic group.

Although the use application of the ink according to the present disclosure is not particularly limited, the ink is suitable as an ink for an ink-jet recording system including a line head.

The ink according to the present disclosure having the above-described configuration may suppress the occurrence of nozzle clogging and may form images having desirable abrasion resistance. The presumed reason is described below. The ink according to the present disclosure includes the self-emulsification specific resin as a binder resin. The specific resin maintains a stable association state in a state before the ink according to the present disclosure is ejected (a state where a sufficient solvent is present). Thus, the ink according to the present disclosure is unlikely to cause nozzle clogging due to aggregation of the binder resin.

Furthermore, when the solvent permeates the recording medium after the ink according to the present disclosure is ejected onto the recording medium, the specific resin spreads over the recording medium as it is difficult to maintain the association state. As a result, the specific resin forms a pseudo film to protect the pigment particles adhering to the surface of the recording medium. The pseudo film is a low-density thin layer formed when molecules of the specific resin adhere to each other at points on the surfaces of the molecules. As the specific resin forms a low-density thin layer instead of a high-density thick layer, the pigment particles may be efficiently protected even in a small amount. The specific resin includes the first repeating unit having a rigid side chain (a straight-chain alkyl group having 9 or more and 15 or less carbon atoms). The first repeating unit promotes the formation of the above-described pseudo film by the specific resin. Furthermore, in order for the image formed with the ink according to the present disclosure to exhibit desirable abrasion resistance, it is desirable that the specific resin penetrates into the recording medium to some extent after the ink according to the present disclosure is ejected onto the recording medium. However, as the specific resin includes the first repeating unit, the specific resin tends to stay on the surface of the recording medium. The ink according to the present disclosure includes specific alkanediol as a penetrant. As the specific alkanediol has moderately good permeability, the specific alkanediol causes the specific resin to penetrate into the recording medium as appropriate. Thus, the ink according to the present disclosure makes it possible to form an image having desirable abrasion resistance.

The ink according to the present disclosure is described below in more detail. Each component described below may be used as one type alone or may be used as two or more types in combination.

[Pigment Particles]

In the ink according to the present disclosure, for example, pigment particles are dispersed in a solvent. From the viewpoint of an improvement in the color density, the hue, or the stability of the ink according to the present disclosure, D50 of the pigment particles is preferably 30 nm or more and 200 nm or less, and more preferably 70 nm or more and 130 nm or less.

Examples of the pigments contained in the pigment particles include yellow pigment, orange pigment, red pigment, blue pigment, violet pigment, and black pigment. Examples of the yellow pigment include C.I. pigment yellow (74, 93, 95, 109, 110, 120, 128, 138, 139, 151, 154, 155, 173, 180, 185, and 193). Examples of the orange pigment include C.I. pigment orange (34, 36, 43, 61, 63, and 71). Examples of the red pigment include C.I. pigment red (122 and 202). Examples of the blue pigment include C.I. pigment blue (15, more specifically 15:3). Examples of the violet pigment include C.I. pigment violet (19, 23, and 33). Examples of the black pigment include C.I. pigment black (7).

In the ink according to the present disclosure, the content ratio of the pigment particles is preferably 1.0% by mass or more and 12.0% by mass or less, and more preferably 4.0% by mass or more and 8.0% by mass or less. When the content ratio of the pigment particles is 1.0% by mass or more, the image density of an image formed with the ink according to the present disclosure may be improved. When the content ratio of the pigment particles is 12.0% by mass or less, the fluidity of the ink according to the present disclosure may be improved.

[Binder Resin]

The binder resin includes a self-emulsification specific resin. Although it is preferable that the binder resin exclusively includes the specific resin, the binder resin may further include a resin other than the specific resin. The content ratio of the specific resin in the binder resin is preferably 80% by mass or more, more preferably 95% by mass or more, and further preferably 100% by mass.

In the ink according to the present disclosure, the content ratio of the binder resin is preferably 0.1% by mass or more and 5.0% by mass or less, and more preferably 0.5% by mass or more and 2.0% by mass or less. When the content ratio of the binder resin is 0.1% by mass or more, the abrasion resistance of an image formed with the ink according to the present disclosure may be further improved. When the content ratio of the binder resin is 5.0% by mass or less, it is possible to suppress the occurrence of nozzle clogging more effectively.

(Specific Resin)

The specific resin includes the first repeating unit derived from specific alkyl ester (meth)acrylate (hereinafter sometimes referred to as "first compound") including a straight-chain alkyl group having 9 or more and 15 or less carbon atoms. Examples of the straight-chain alkyl group having 9 or more and 15 or less carbon atoms include a nonyl group, a decyl group, a undecyl group, a dodecyl group, a tridecyl group, a tetradecyl group, and a pentadecyl group.

Examples of the first compound include nonyl (meth)acrylate, decyl (meth)acrylate, undecyl (meth)acrylate, lauryl (meth)acrylate, tridecyl (meth)acrylate, myristyl (meth)acrylate, and pentadecyl (meth)acrylate.

The first compound is preferably lauryl (meth)acrylate or myristyl (meth)acrylate.

The content ratio of the first repeating unit in the specific resin is 6.0% by mass or more and 20.0% by mass or less, preferably 8.0% by mass or more and 12.0% by mass or less.

When the content ratio of the first repeating unit is 6.0% by mass or more and 20.0% by mass or less, the abrasion resistance of an image formed with the ink according to the present disclosure may be improved.

The specific resin preferably includes a second repeating unit derived from a compound (hereinafter sometimes referred to as "second compound") including a glycidyl group and a (meth)acryloyl group. The resin including the first repeating unit and the second repeating unit is likely to function as a self-emulsification specific resin. Examples of the second compound include glycidyl (meth)acrylate.

When the specific resin includes the second repeating unit, the content ratio of the second repeating unit in the specific resin is preferably 0.1% by mass or more and 3.0% by mass or less, and more preferably 0.3% by mass or more and 1.0% by mass or less. When the content ratio of the second repeating unit is 0.1% by mass or more and 3.0% by mass or less, the abrasion resistance of an image formed with the ink according to the present disclosure may be further improved.

It is preferable that the specific resin further includes a third repeating unit derived from alkyl ester (meth)acrylate (hereinafter sometimes referred to as "third compound") including an alkyl group having 1 or more and 8 or less carbon atoms.

Examples of the third compound include methyl (meth)acrylate, ethyl (meth)acrylate, propyl (meth)acrylate, butyl (meth)acrylate, pentyl (meth)acrylate, hexyl (meth)acrylate, 2-Ethylhexyl (meth)acrylate, heptyl (meth)acrylate, and octyl (meth)acrylate. The third compound is preferably methyl (meth)acrylate, butyl (meth)acrylate, or 2-Ethylhexyl (meth)acrylate.

When the specific resin includes the third repeating unit, the content ratio of the third repeating unit in the specific resin is preferably 75.0% by mass or more and 94.0% by mass or less, and more preferably 85.0% by mass or more and 92.0% by mass or less.

The specific resin may further include a repeating unit (e.g., styrene unit) other than the first repeating unit to the third repeating unit. The total content ratio of the first repeating unit to the third repeating unit in the specific resin is preferably 80.0% by mass or more, more preferably 95.0% by mass or more, and further preferably 100.0% by mass.

The combination of monomers as raw materials of the specific resin is preferably a combination A and a combination B described below.

The combination A: methyl methacrylate, butyl acrylate, lauryl acrylate, 2-Ethylhexyl acrylate, and glycidyl methacrylate The combination B: methyl methacrylate, butyl acrylate, myristyl acrylate, 2-Ethylhexyl acrylate, and glycidyl methacrylate (Method for Synthesizing Specific Resin)

Examples of the method for synthesizing the specific resin include a method including a first step of causing reaction of a solution including the first compound, the third compound used as appropriate, a polymerization initiator, and a solvent (for example, isopropyl alcohol and methyl ethyl ketone). The method for synthesizing the specific resin preferably further includes, after the first step, a second step of adding a solution including the second compound and a polymerization initiator and then causing reaction.

The first step and the second step are preferably performed under a reflux condition. The reaction conditions for the first step and the second step may be, for example, a reaction temperature of 60° C. or higher and 80° C. or lower and a reaction time of 3 hours or longer and 10 hours or shorter.

[Penetrant]

The penetrant includes specific alkanediol. Although the penetrant preferably includes the specific alkanediol exclusively, the penetrant may further include other penetrants other than the specific alkanediol. The content ratio of the specific alkanediol in the penetrant is preferably 80% by mass or more, more preferably 95% by mass or less, and further preferably 100% by mass.

In the ink according to the present disclosure, the content ratio of the penetrant is preferably 0.1% by mass or more and 3.0% by mass or less, and more preferably 0.3% by mass or more and 1.0% by mass or less. When the content ratio of the penetrant is 0.1% by mass or more and 3.0% by mass or less, the abrasion resistance of the ink according to the present disclosure may be further improved.

(Specific Alkanediol)

The specific alkanediol may be straight-chain or branched-chain. The positions of the two hydroxy groups in the specific alkanediol are not particularly limited. Examples of the specific alkanediol include 1,2-Alkanediol, 1,3-Alkanediol, 1,4-Alkanediol, 1,5-Alkanediol, 2,4-Alkanediol, and am-Alkanediol.

Examples of the specific alkanediol include 1,2-Hexanediol, 1,6-Hexanediol, 1,2-Heptanediol, 1,7-Heptanediol, 1,2-Octanediol, 1,8-Octanediol, and 2-Ethyl-1,3-hexanediol. The specific alkanediol is preferably 1,2-Hexanediol or 1,2-Octanediol.

The boiling point of the specific alkanediol at one atmosphere is preferably 200° C. or higher and 270° C. or lower.

[Pigment Dispersion Resin]

The ink according to the present disclosure preferably further includes a pigment dispersion resin. The pigment dispersion resin has water solubility and exists in a dissolved state in the ink according to the present disclosure. The pigment dispersion resin adheres to the surface of pigment particles to suppress aggregation of the pigment particles.

Examples of the pigment dispersion resin include a copolymer of at least one type of monomer selected from alkyl ester (meth)acrylate, styrene, and vinylnaphthalene and at least one type of monomer selected from (meth)acrylic acid and maleic acid.

The pigment dispersion resin is preferably the resin including a repeating unit ((meth)acrylic acid unit) derived from (meth)acrylic acid, a repeating unit (alkyl ester (meth)acrylate unit) derived from alkyl ester (meth)acrylate, and a styrene unit. In this case, the ratio of the (meth)acrylic acid unit to all the repeating units included in the pigment dispersion resin is preferably 20% by mass or more and 60% by mass or less. The ratio of the alkyl ester (meth)acrylate unit to all the repeating units included in the pigment dispersion resin is preferably 30% by mass or more and 65% by mass or less. The ratio of the styrene unit to all the repeating units included in the pigment dispersion resin is preferably 5% by mass or more and 25% by mass or less. The pigment dispersion resin is more preferably the resin including a repeating unit derived from methacrylic acid, a repeating unit derived from methyl methacrylate, a repeating unit derived from butyl acrylate, and a styrene unit.

When the ink according to the present disclosure contains a pigment dispersion resin, the content ratio of the pigment dispersion resin in the ink according to the present disclosure is preferably 0.5% by mass or more and 8.0% by mass or less, and more preferably 1.5% by mass or more and 4.0% by mass or less. When the content ratio of the pigment dispersion resin is 0.5% by mass or more, aggregation of pigment particles may be suppressed more effectively. When the content ratio of the pigment dispersion resin is 8.0% by mass or less, the occurrence of nozzle clogging may be suppressed more effectively.

The acid value of the pigment dispersion resin is, for example, 50 mg KOH/g or more and 150 mg KOH/g or less. When the acid value of the pigment dispersion resin is 50 mg KOH/g or more and 150 mg KOH/g or less, aggregation of pigment particles may be suppressed more effectively, while the storage stability of the ink according to the present disclosure may be improved.

The acid value of the pigment dispersion resin may be adjusted by changing the amount of monomer used when the pigment dispersion resin is synthesized. For example, when the pigment dispersion resin is synthesized, the use of a monomer (e.g., acrylic acid and methacrylic acid) having an acidic functional group (e.g., a carboxy group) may increase the acid value of the pigment dispersion resin.

Mw of the pigment dispersion resin is, for example, 10000 or more and 50000 or less. When Mw of the pigment dispersion resin is 10000 or more and 50000 or less, an increase in the viscosity of the ink according to the present disclosure may be suppressed, while the image density of an image formed with the ink according to the present disclosure may be improved.

Mw of the pigment dispersion resin may be adjusted by changing a polymerization condition (e.g., the amount of polymerization initiator used, the polymerization temperature, and the polymerization time) of the pigment dispersion resin.

For the polymerization of the pigment dispersion resin, the amount of polymerization initiator used is preferably 0.001 mol or more and 5 mol or less, and more preferably 0.01 mol or more and 2 mol or less, with respect to the monomer mixture of 1 mol. For the polymerization of the pigment dispersion resin, for example, the polymerization temperature may be 50° C. or higher and 70° C. or lower, and the polymerization time may be 10 hours or longer and 24 hours or shorter. The polymerized pigment dispersion resin may be used without change as a raw material of the ink according to the present disclosure or may be used as a raw material of the ink according to the present disclosure after being neutralized with an equal amount of base (e.g., KOH).

[Water]

The ink according to the present disclosure preferably includes water as a solvent. When the ink according to the present disclosure contains water, the content ratio of water in the ink according to the present disclosure is, for example, 60.0% by mass or more and 90.0% by mass or less.

[Surfactant]

The ink according to the present disclosure preferably further includes a surfactant. The surfactant improves the compatibility and the dispersion stability of each component included in the ink according to the present disclosure. Further, the surfactant improves the permeability (wetting property) of the ink according to the present disclosure to a recording medium. The surfactant is preferably a non-ionic surfactant.

The non-ionic surfactant is preferably ethylene oxide adduct of acetylenediol or polyalkylene glycol alkyl ether (meth)acrylate-alkyl (meth)acrylate-polyalkylene glycol (meth)acrylate-lauryl (meth)acrylate copolymer, and more preferably ethylene oxide adduct of acetylenediol or polyethylene glycol methyl ether acrylate-butyl acrylate-polypropylene glycol acrylate-lauryl acrylate-methyl methacrylate copolymer.

When the ink according to the present disclosure contains a surfactant, the content ratio of the surfactant in the ink according to the present disclosure is preferably 1.0% by mass or more and 5.0% by mass or less, and more preferably 2.0% by mass or more and 3.0% by mass or less.

[Other Components]

The ink according to the present disclosure may further include known additives (more specifically, for example, dissolution stabilizer, anti-drying agent, antioxidant, viscosity modifier, pH adjuster, and mildew-proofing agent) as appropriate.

The dissolution stabilizer compatibilizes each component included in the ink according to the present disclosure to stabilize the dissolved state of the ink according to the present disclosure. Examples of the dissolution stabilizer include 2-Pyrrolidone, N-Methyl-2-pyrrolidone, and γ-Butyrolactone. The dissolution stabilizer is preferably 2-Pyrrolidone. When the ink according to the present disclosure contains a dissolution stabilizer, the content ratio of the dissolution stabilizer in the ink according to the present disclosure is preferably 2.0% by mass or more and 15.0% by mass or less, and more preferably 5.0% by mass or more and 10.0% by mass or less.

[Method for Manufacturing Ink]

The ink according to the present disclosure may be manufactured by uniformly mixing, by an agitator, for example, the pigment dispersion liquid including pigment particles, a resin emulsion including a binder resin, a penetrant, and other components (e.g., water, a surfactant, and a dissolution stabilizer) blended as appropriate. During the manufacturing of the ink according to the present disclosure, after components are uniformly mixed, a filter (e.g., a filter having a pore diameter of 5 μm or less) may be used to remove foreign matter and coarse particles.

(Pigment Dispersion Liquid)

The pigment dispersion liquid is a dispersion liquid including pigment particles. A dispersion medium of the pigment dispersion liquid is preferably water. The pigment dispersion liquid preferably further includes a pigment dispersion resin and a surfactant in order to improve the dispersibility of the pigment particles. The surfactant is preferably a non-ionic surfactant.

In the pigment dispersion liquid, D50 of the pigment particles is preferably 50 nm or more and 200 nm or less, and more preferably 70 nm or more and 130 nm or less.

The content ratio of the pigment particles in the pigment dispersion liquid is preferably 5.0% by mass or more and 25.0% by mass or less, and more preferably 10.0% by mass or more and 20.0% by mass or less. When the pigment dispersion liquid contains a pigment dispersion resin, the content ratio of the pigment dispersion resin in the pigment dispersion liquid is preferably 2.0% by mass or more and 10.0% by mass or less, and more preferably 4.0% by mass or more and 8.0% by mass or less. When the pigment dispersion liquid contains a surfactant, the content ratio of the surfactant in the pigment dispersion liquid is preferably 0.1% by mass or more and 2.0% by mass or less, and more preferably 0.3% by mass or more and 1.0% by mass or less. In the pigment dispersion liquid, the content ratio of the dispersion medium is, for example, 60.0% by mass or more and 90.0% by mass or less.

When the pigment dispersion liquid includes a pigment dispersion resin, it is preferable that at least a part of the pigment particles in the pigment dispersion liquid has the pigment dispersion resin adhering to the surface thereof.

The pigment dispersion liquid may be prepared by wet dispersion of the pigment particles, the dispersion medium (e.g., water), and components (e.g., a pigment dispersion resin and a surfactant) added as appropriate with a media wet disperser. For the wet dispersion with the media wet disperser, for example, small particle diameter beads (for example, beads having $D_{50}$ of 0.5 mm or larger and 1.0 mm or smaller) may be used as media. Although the material of the beads is not particularly limited, rigid materials (for example, glass and zirconia) are preferable.

In the wet dispersion using the media wet disperser, the particle diameter of the beads is changed to adjust D50 of the pigment particles, the degree of dispersion of the pigment particles, and the ratio of the pigment dispersion resin adhering to the surface of the pigment particles to the entire pigment dispersion resin. Specifically, the smaller the particle diameter of the beads used, the more D50 of the pigment particles may be reduced. The smaller the particle diameter of the beads used, the higher the ratio of the pigment dispersion resin adhering to the pigment particles to the entire pigment dispersion resin.

$D_{50}$ of the pigment particles may be measured by using, for example, a dynamic light-scattering particle diameter distribution measurement device ("Zetasizer Nano ZS" manufactured by Sysmex Corporation) with, as a sample, the solution obtained by diluting the pigment dispersion liquid with ion-exchanged water 300 times.

When a pigment dispersion liquid is added during the manufacturing of the ink according to the present disclosure, the ratio of the pigment dispersion liquid to all the raw materials of the ink is, for example, 25.0% by mass or more and 60.0% by mass or less.

(Resin Emulsion)

The resin emulsion includes a binder resin and a dispersion medium (e.g., water). The resin emulsion may be obtained by adding a dispersion medium to a binder resin and then causing emulsification. As the binder resin contains a self-emulsification specific resin, it is not necessary to use a surfactant for emulsification.

The content ratio of the binder resin in the resin emulsion is preferably 15.0% by mass or more and 60.0% by mass or less, and more preferably 30.0% by mass or more and 50.0% by mass or less. When the resin emulsion is added during the manufacturing of the ink according to the present disclosure, the ratio of the resin emulsion to all the raw materials of the ink is, for example, 1.0% by mass or more and 6.0% by mass or less.

EMBODIMENT

An embodiment of the present disclosure is described below. The present disclosure is not limited to the embodiment below.

<Examination 1: Binder Resin>

In the embodiment, first, examination was made as to which one of a forcibly emulsified resin, a core-shell resin, or a self-emulsification resin is desirable as a binder resin. The method for preparing each raw material used to manufacture the ink is described below.

(Preparation of Pigment Dispersion Resin)

An alkali-soluble resin including a repeating unit (MAA unit) derived from methacrylic acid, a repeating unit (MMA unit) derived from methyl methacrylate, a repeating unit (BA unit) derived from butyl acrylate, and a repeating unit (ST unit) derived from styrene was prepared. The alkali-soluble resin had a mass-average molecular weight (Mw) of 20000 and an acid value of 100 mg KOH/g. The mass ratio of the repeating units in the alkali-soluble resin was "MAA unit:MMA unit:BA unit:ST unit=40:15:30:15". 100 parts by mass of the alkali-soluble resin was mixed with the potassium hydroxide aqueous solution containing 10.5 parts by mass of potassium hydroxide. Thus, the alkali-soluble resin was neutralized with the equal amount (strictly, the amount by 105%) of KOH. Accordingly, the pigment dispersion resin solution containing a pigment dispersion resin and water was obtained.

(Preparation of Pigment Dispersion Liquid)

The pigment particles ("Lionol (registered trademark) Blue FG-7330" manufactured by Toyocolor Co., Ltd., components: copper phthalocyanine, color index: pigment blue 15:3), the above-described pigment dispersion resin solution, "Olfine (registered trademark) E1010" (ethylene oxide adduct of acetylenediol) manufactured by Nissin Chemical Industry Co., Ltd. as a surfactant, and ion-exchanged water were put into a vessel having a capacity of 0.6 L so as to have the composition illustrated in Table 1 below. Subsequently, the content of the vessel was subjected to wet dispersion using a media wet disperser ("DYNO®-MILL" manufactured by Willy A. Bachofen (WAB)).

The content ratio of "water" in Table 1 below represents the total content ratio of the ion-exchanged water put into the above-described vessel and the water included in the pigment dispersion resin solution (specifically, the water included in the potassium hydroxide aqueous solution used to neutralize the alkali-soluble resin and the water generated due to the neutralization reaction of the alkali-soluble resin and the potassium hydroxide.

TABLE 1

| Type | Content ratio [% by mass] |
|---|---|
| Water | 78.5 |
| Pigment dispersion resin | 6.0 |
| Pigment particles | 15.0 |
| Surfactant | 0.5 |
| Total | 100.0 |

Subsequently, the content of the above-described vessel was subjected to dispersion processing using zirconia beads (a particle diameter of 0.5 mm) as media and a wet disperser ("Nano Grain Mill" manufactured by Asada Iron Works Co., Ltd.). The dispersion conditions were a temperature of 10° C. and a circumferential velocity of 8 m/sec. Accordingly, a pigment dispersion liquid A was obtained.

The volume median diameter ($D_{50}$) of the pigment particles included in the obtained pigment dispersion liquid A was measured. Specifically, the obtained pigment dispersion liquid was diluted with ion-exchanged water 300 times, and the resultant was used as a measurement sample. $D_{50}$ of the pigment particles in the measurement sample was measured by using a dynamic light-scattering particle diameter distribution measurement device ("Zetasizer Nano ZS" manufactured by Sysmex Corporation). $D_{50}$ of the pigment particles in the measurement sample was set as $D_{50}$ of the pigment particles included in the pigment dispersion liquid. $D_{50}$ of the pigment particles included in the pigment dispersion liquid was 100 nm.

(Non-ionic Surfactant)

A copolymer including a repeating unit (PEGA unit) derived from polyethylene glycol methyl ether acrylate, a repeating unit (PPGA unit) derived from polypropylene glycol acrylate, a repeating unit (LA unit) derived from lauryl acrylate, and a repeating unit (MMA unit) derived from methyl methacrylate was prepared. The copolymer was used as a non-ionic surfactant (A). The mass ratio of the repeating units in the copolymer was "PEGA unit:PPGA unit:LA unit:MMA unit=60:20:12:8".

The non-ionic surfactant (A) had a surface tension of 30.5 mN/m and Mw of 5000. The non-ionic surfactant (A) was soluble in water. The surface tension of the non-ionic surfactant (A) was measured at a liquid temperature of 25° C. by using the Wilhelmy method with a surface tension meter ("CBVP-Z" manufactured by Kyowa Interface Science Co., Ltd.).

Mw of the non-ionic surfactant (A) was measured under the conditions below by using gel permeation chromatography ("HLC-8020GPC" manufactured by Tosoh Corporation). The calibration curve was generated by using TSKgel Standard Polystyrene manufactured by Tosoh Corporation, F-40, F-20, F-4, F-1, A-5000, A-2500, and A-1000, and n-Propylbenzene.

(Measurement Conditions for Mass-Average Molecular Weight)

Column: "TSKgel SuperMultiporeHZ-H" manufactured by Tosoh Corporation (semi-micro column of 4.6 mm I.D.× 15 cm)

Number of columns: 3

Eluent: tetrahydrofuran

Flow velocity: 0.35 mL/min

Sample injection volume: 10 μL

Measurement temperature: 40° C.

Detector: IR detector (Preparation of Resin Emulsion)

Resin emulsions (E-1) to (E-3) were prepared by using the methods below.

The resin emulsion (E-1): a forcibly emulsified resin emulsion containing a resin (A) that is a forcibly emulsified resin.

The resin emulsion (E-2): a core-shell resin emulsion containing a core-shell resin (a core part: a resin (A), a shell part: a shell resin (B))

The resin emulsion (E-3): a self-emulsification resin emulsion containing a resin (C-1) that is a self-emulsification resin.

(Resin Emulsion (E-1))

A stirrer, a nitrogen introduction pipe, a condenser, an agitator, and a drop funnel were set in a four-necked flask (a capacity of 1000 mL) as a device. The device was used as a reaction vessel. Subsequently, 100 g of isopropyl alcohol and 300 g of methyl ethyl ketone were put into the reaction vessel. Then, the content of the reaction vessel was subjected to heated reflux at 70° C. while bubbling nitrogen.

Separately, 50.0 g of butyl acrylate (BA), 10.0 g of lauryl acrylate (LA), 25.0 g of methyl methacrylate (MMA), 15.0 g of 2-Ethylhexyl acrylate (2EHA), and 0.400 g of azobisisobutyronitrile (AIBN, polymerization initiator) were mixed to obtain a monomer solution (M-1). The monomer solution (M-1) was dripped into the reaction vessel in approximately two hours, while the content of the reaction vessel was subjected to heated reflux at 70° C. After the dripping, the content of the reaction vessel was subjected to heated reflux at 70° C. in another six hours. Subsequently, a solution (X) containing 0.200 g of AIBN and 50 g of methyl ethyl ketone was dripped in the reaction vessel in 15 minutes. After the dripping, the content of the reaction vessel was subjected to heated reflux at 70° C. in another five hours. Thus, a resin solution containing the resin (A) was obtained. Then, the obtained resin solution was heated at 70° C. under a reduced pressure to evaporate the solvent (methyl ethyl ketone and isopropyl alcohol) to obtain a dry resin (A). The resin (A) was a forcibly emulsified acrylic acid resin.

After 45 g of water and 50 g of the resin (A) were put in the flask, the resultant was heated at 70° C. Subsequently, the resultant was left to stand for 15 minutes. Accordingly, the resin (A) was blended with water. Then, 5 g of a non-ionic surfactant ("EMULGEN (registered trademark) 1153S-70" manufactured by Kao Corporation, polyoxyethylene alkyl ether) was additionally put in the above-described flask, and the resultant was slowly stirred. The dispersion liquid obtained after stirring was processed by a high-pressure mill ("Panda PLUS2000" manufactured by GEA Niro Soavi) (600 MPa, 3 paths). Accordingly, the resin emulsion (E-1), which is a forcibly emulsified resin emulsion containing the resin (A), was obtained.

(Resin Emulsion (E-2))

To prepare for the resin emulsion (E-2), a shell resin (B) was first synthesized. Specifically, the solution having a mix of 15.0 g of butyl acrylate (BA), 20.0 g of methacrylic acid (MAA), 65.0 g of methyl methacrylate (MMA), and 0.400 g of azobisisobutyronitrile (AIBN, polymerization initiator) was a monomer solution (M-2). A dried shell resin (B) was obtained by using the same method as the method for the synthesis of the resin (A) except that the monomer solution (M-2) was used instead of the monomer solution (M-1).

Subsequently, the ion-exchanged water was subjected to bubbling (deoxidation processing) using nitrogen gas. Then, 49.3 g of the ion-exchanged water having undergone deoxidation processing was put in the flask. The flask was used as a reaction vessel. Then, the content of the reaction vessel was heated up to 60° C. After heating, 0.5 g of 2,2'-Azobis[2-(2-Imidazoline-2-yl) propane], which was a polymerization initiator, was put in the reaction vessel, and the polymerization initiator was dissolved with the ion-exchanged water in 60 minutes. Then, the content of the reaction vessel was heated up to 63° C. After heating, 10.0 g of the shell resin (B) and 0.2 g of sodium hydroxide were put in the reaction vessel. Subsequently, the content of the reaction vessel was heated up to 65° C. After heating, 20 g of butyl acrylate (BA), 4 g of lauryl acrylate (LA), 10 g of methyl methacrylate (MMA), and 6 g of 2-Ethylhexyl acrylate (2EHA) were put in the reaction vessel as a monomer (having the same composition as a monomer of the resin (A)) of the resin forming the core part. Then, the content of the reaction vessel was heated up to 75° C. After heating, the content of the reaction vessel was reacted (emulsion polymerization) at 75° C. for 60 minutes. After the reaction, the content of the reaction vessel was cooled up to the room temperature. Accordingly, the resin emulsion (E-2), which is a core-shell resin emulsion containing a core-shell resin (the core part: the resin (A), the shell part: the shell resin (B)), was obtained.

(Resin Emulsion (E-3))

The resin (C-1) was synthesized by using the same method as the method for the synthesis of the resin (A) except that the following points were changed. For the synthesis of the resin (C-1), the solution containing 0.200 g of AIBN, 0.5 g of glycidyl methacrylic (GMA), and 30 g of methyl ethyl ketone was used as the solution (X). The obtained resin (C-1) was a self-emulsification acrylic acid resin.

40.2 parts by mass of the resin (C-1) and 59.8 parts by mass of water were mixed. Accordingly, the resin emulsion (E-3) (appearance: white turbidity state), which is a self-emulsification resin emulsion containing the resin (C-1), was obtained.

The details of the resin (A), the shell resin (B), and the resin (C-1) are illustrated below in Table 2. The details of the emulsions (E-1) to (E-3) are illustrated below in Table 3. In Table 3 below, "other components" specifically refer to sodium hydroxide and a polymerization initiator.

TABLE 2

|  |  | Resin (A) | Shell resin (B) | Resin (C-1) |
|---|---|---|---|---|
| Monomer [g] | MMA | 25.0 | 65.0 | 25.0 |
|  | BA | 50.0 | 15.0 | 50.0 |
|  | LA | 10.0 | — | 10.0 |
|  | 2EHA | 15.0 | — | 15.0 |
|  | MAA | — | 20.0 | — |
|  | GMA | — | — | 0.5 |
|  | Total | 100.0 | 100.0 | 100.5 |

TABLE 3

|  |  | Emulsion (E-1) | Emulsion (E-2) | Emulsion (E-3) |
|---|---|---|---|---|
| Content ratio [% by mass] | Resin (A) | 50.0 | 40.0 | — |
|  | Shell resin (B) | — | 10.0 | — |
|  | Resin (C-1) | — | — | 40.2 |
|  | Surfactant | 5.0 | — | — |
|  | Water/other components | 45.0 | 50.0 | 59.8 |

[Preparation of Inks (I-1) to (I-3)]

Ion-exchanged water was put in a flask equipped with an agitator ("Three-one motor (registered trademark) BL-600" manufactured by SHINTO Scientific Co., Ltd.). While the content was agitated by the above-described agitator (the agitation speed: 400 rpm), the above-described pigment dispersion liquid, the resin emulsion (specifically, any of the resin emulsions (E-1) to (E-3)), 2-Pyrolidone, the above-described non-ionic surfactant (A), and 1,2-Octanediol as a penetrant were put in this order. The ratio of the input amount of each raw material was as illustrated below in Table 4. The types of input resin emulsions were as illustrated below in Table 5. 2-Pyrrolidone was a dissolution stabilizer.

TABLE 4

| Raw material | Input amount [% by mass] |
|---|---|
| Pigment dispersion liquid | 40.0 |
| Resin emulsion | 3.0 |
| 2-Pyrrolidone | 7.0 |
| Non-ionic surfactant (A) | 2.5 |
| Penetrant (1,2-Octanediol) | 0.5 |
| Ion-exchanged water | Remainder |
| Total | 100.0 |

To remove foreign matter and coarse particles from the obtained mixture, a filter having a pore diameter of 5 μm was used to filter the mixture. Thus, the ink (specifically, any of the inks (I-1) to (I-3)) was obtained.

[Evaluation 1]

With regard to each of the obtained inks (I-1) to (I-3), the image density and the abrasion resistance of a formed image and nozzle clogging were evaluated by using the method below. Table 5 below illustrates evaluation results.

(Image Density)

An ink-jet recording device (a prototype device manufactured by KYOCERA Document Solutions Inc., 600 dpi) was used as an evaluation device. The evaluation device includes a piezo recording head including nozzles (a hole diameter of an opening: 10 μm). The evaluation target (i.e., any of the inks (I-1) to (I-3)) was set in the recording head of the evaluation device. Subsequently, a solid image of 10 cm×10 cm was formed on an A4 regular sheet ("C$^2$" manufactured by Fuji Xerox Co., Ltd., PPC sheet) using an evaluation device in the environment with a temperature of 25° C. and a humidity of 60% RH (solid image formation test). The volume of the ink droplets ejected from the individual nozzles of the recording head was set to 11 pL.

The image density of the formed solid image was measured by a reflection densitometer ("RD-19" manufactured by X-Rite, Incorporated.). Specifically, the image density was measured at ten randomly selected positions in the solid image. The arithmetic mean value of the obtained image densities at the ten positions was used as the evaluation value of the image densities. The image density was evaluated as good (A) when the evaluation value was 1.1 or more and evaluated as poor (B) when the evaluation value was less than 1.1.

(Nozzle Clogging)

After the above-described solid image formation test, the nozzles of the evaluation device were cleaned by a nozzle cleaning function of the evaluation device in the environment with a temperature of 25° C. and a humidity of 10% RH. Specifically, after 3 mL of the ink was purged through each of the nozzles of the evaluation device to refresh the inside of the nozzles, the ink adhering to the tips of the nozzles were wiped off by a wiping function. Then, the evaluation device was left to stand for one hour in the environment with a temperature of 25° C. and a humidity of 10% RH. Then, using the evaluation device, a solid image was formed by using the same method as the method for the above-described solid image formation test. Here, if there was no nozzle clogging in the evaluation device, it was evaluated that the ink was able to suppress the occurrence of nozzle clogging (nozzle clogging "A"). On the other hand, when there was nozzle clogging in the evaluation device, it was evaluated that the ink was not able to suppress the occurrence of nozzle clogging (nozzle clogging "B").

(Abrasion Resistance)

In the environment with a temperature of 25° C. and a humidity of 60% RH, a solid image of 4 cm×5 cm was formed on an A4 regular sheet ("C$^2$" manufactured by Fuji Xerox Co., Ltd., PPC sheet) using the evaluation device. The volume of ink droplets ejected from the recording head was set to 11 pL.

After the solid image was formed, a test sheet (the above-described unprinted regular sheet) was placed on the surface of the regular sheet on which the solid image was formed (the surface on the solid image side). While a load of 1 kg was applied to the test sheet by using a weight, the solid image was abraded back and forth five times by one surface of the test sheet. Then, the image density on the above-described surface of the test sheet was measured by using the above-described reflection densitometer. Specifically, the image density was measured at ten randomly selected positions on the above-described surface. The maximum value among the obtained image densities at the ten positions was used as an evaluation value for abrasion resistance. The abrasion resistance was evaluated as good (A) when the evaluation value was 0.02 or less and was evaluated as poor (B) when the evaluation value was more than 0.02.

TABLE 5

| Ink | | I-1 | I-2 | I-3 |
|---|---|---|---|---|
| Resin emulsion | Type | E-1 | E-2 | E-3 |
| | Emulsification technique | Forcibly emulsified | Core-shell | Self-emulsification |
| | Resin | A | A + B | C |
| Evaluation | Image density | 1.2 (A) | 1.2 (A) | 1.3 (A) |
| | Nozzle clogging | B | B | A |
| | Abrasion resistance | B | A | A |

As illustrated in Table 2 to Table 5, in the ink (I-3), the binder resin included a self-emulsification resin. The ink (I-3) suppressed the occurrence of nozzle clogging and had good image density and abrasion resistance of formed images.

On the other hand, in the ink (I-1), the binder resin included a forcibly emulsified resin. Furthermore, in the ink (I-2), the binder resin included a core-shell resin. As a result, the ink (I-1) and the ink (I-2) were not able to suppress the occurrence of nozzle clogging. Moreover, with the ink (I-1), a formed image had poor abrasion resistance.

According to the results of the inks (I-1) to (I-3), it is determined that, when the binder resin includes a self-emulsification specific resin, the occurrence of nozzle clogging may be suppressed and the abrasion resistance of a formed image may be improved.

<Examination 2: First Repeating Unit>

Next, the first repeating unit included in the specific resin was examined

[Preparation of Resin Emulsions (E-4) to (E-12)]

Resin emulsions (E-4) to (E-12) were prepared by using the same method as the method for the preparation of the resin emulsion (E-3) described above except that the following points were changed. For the preparation of the resin emulsions (E-4) to (E-12), the amount of monomer used in the resin synthesis was changed as illustrated in Table 6 below. The resin emulsions (E-3) to (E-12) were self-emulsification resin emulsions containing self-emulsification resins (i.e., resins (C-1) to (C-10)), respectively. Out of the resins (C-1) to (C-10), the resins (C-1), (C-5), (C-6) and (C-8) to (C-10) are specific resins.

In Table 6 below, MyA and SMA represent myristyl acrylate and stearyl methacrylate, respectively. Out of the monomers described in Table 6 below, lauryl acrylate (LA) and myristyl acrylate (MyA) are specific alkyl ester (meth) acrylate.

TABLE 6

| Resin emulsion | | E-3 | E-4 | E-5 | E-6 | E-7 | E-8 | E-9 | E-10 | E-11 | E-12 |
|---|---|---|---|---|---|---|---|---|---|---|---|
| Resin | | C-1 | C-2 | C-3 | C-4 | C-5 | C-6 | C-7 | C-8 | C-9 | C-10 |
| Monomer | MMA | 25.0 | 25.0 | 10.0 | 25.0 | 25.0 | 28.0 | 30.0 | 10.0 | 20.0 | 30.0 |
| [parts by | BA | 50.0 | 50.0 | 50.0 | 60.0 | 50.0 | 50.0 | 50.0 | 30.0 | 20.0 | 30.0 |
| mass] | LA | 10.0 | — | — | — | — | 7.0 | 5.0 | 10.0 | 10.0 | 10.0 |

TABLE 6-continued

| Resin emulsion | | E-3 | E-4 | E-5 | E-6 | E-7 | E-8 | E-9 | E-10 | E-11 | E-12 |
|---|---|---|---|---|---|---|---|---|---|---|---|
| | 2EHA | 15.0 | 25.0 | 15.0 | 15.0 | 15.0 | 15.0 | 15.0 | 50.0 | 50.0 | 30.0 |
| | SMA | — | — | 10.0 | — | — | — | — | — | — | — |
| | MyA | — | — | — | — | 10.0 | — | — | — | — | — |
| | GMA | 0.5 | 0.5 | 0.5 | 0.5 | 0.5 | 0.5 | 0.5 | 0.5 | 0.5 | 0.5 |
| Repeating unit | First | 10.0 | — | — | — | 10.0 | 7.0 | 5.0 | 10.0 | 10.0 | 10.0 |
| [% by mass] | Second | 0.5 | 0.5 | 0.5 | 0.5 | 0.5 | 0.5 | 0.5 | 0.5 | 0.5 | 0.5 |

[Preparation of Inks (I-4) to (I-12)]

Inks (I-4) to (I-12) were prepared by using the same method as the method for the preparation of the above-described ink (I-3) except that the following points were changed. For the preparation of the inks (I-4) to (I-12), the types of resin emulsions were changed as illustrated in Table 7 below.

[Evaluation 2]

With regard to each of the obtained inks (I-4) to (I-12), the image density and the abrasion resistance of a formed image and nozzle clogging were evaluated by using the same method as the method for the evaluation of the inks (I-1) to (I-3). Table 7 below illustrates evaluation results. Table 7 below also illustrates the evaluation result of the ink (I-3).

TABLE 7

| Ink | | I-3 | I-4 | I-5 | I-6 | I-7 | I-8 | I-9 | I-10 | I-11 | I-12 |
|---|---|---|---|---|---|---|---|---|---|---|---|
| Resin | Type | E-3 | E-4 | E-5 | E-6 | E-7 | E-8 | E-9 | E-10 | E-11 | E-12 |
| emulsion | Resin | C-1 | C-2 | C-3 | C-4 | C-5 | C-6 | C-7 | C-8 | C-9 | C-10 |
| Evaluation | Image density | 1.3 | 1.2 | 1.2 | 1.3 | 1.3 | 1.3 | 1.3 | 1.3 | 1.3 | 1.3 |
| | | (A) | (A) | (A) | (A) | (A) | (A) | (A) | (A) | (A) | (A) |
| | Nozzle clogging | A | A | A | A | A | A | A | A | A | A |
| | Abrasion resistance | A | B | B | B | A | A | B | A | A | A |

As illustrated in Tables 6 and 7, the resins (C-1), (C-5), (C-6), and (C-8) to (C-10) included in the inks (I-3), (I-7), (I-8), and (I-10) to (I-12) include the first repeating unit of 6.0% by mass or more and 20.0% by mass or less. The inks (I-3), (I-7), (I-8), and (I-10) to (I-12) suppressed the occurrence of nozzle clogging and had good image density and abrasion resistance of formed images.

On the other hand, the resins (C-2) to (C-4) included in the inks (I-4) to (I-6) did not include the first repeating unit. The resin (C-7) included in the ink (I-9) included the first repeating unit. However, in the resin (C-7), the content ratio of the first repeating unit was less than 6.0% by mass. As a result, the inks (I-4) to (I-6) and (I-9) had poor abrasion resistance of formed images.

According to the results of the inks (I-3) to (I-12), it is determined that, when the specific resin including the first repeating unit of 6.0% by mass or more and 20.0% by mass or less is used as a binder resin, the abrasion resistance of formed images may be improved.

<Examination 3: Penetrant>

Next, the penetrant used for the ink was examined

[Preparation of Ink (I-13) to (I-15)]

Ion-exchanged water was put into a beaker including an agitator ("Three-one motor (registered trademark) BL-600" manufactured by SHINTO Scientific Co., Ltd.). While the content was agitated by the above-described agitator (the agitation speed: 400 rpm), the above-described pigment dispersion liquid, the resin emulsion (E-3), 2-Pyrolidone, the above-described non-ionic surfactant (A), and a penetrant (specifically, any of the penetrants described in Table 9 below) were put in this order. The ratio of the input amount of each raw material was as illustrated below in Table 8. The types of input penetrants were as illustrated below in Table 10. 2-Pyrrolidone was a dissolution stabilizer.

TABLE 8

| Raw material | Input amount [% by mass] |
|---|---|
| Pigment dispersion liquid | 40.0 |
| Resin emulsion (E-3) | 3.0 |
| 2-Pyrrolidone | 7.0 |
| Non-ionic surfactant (A) | 2.5 |

TABLE 8-continued

| Raw material | Input amount [% by mass] |
|---|---|
| Penetrant | 0.5 |
| Ion-exchanged water | Remainder |

TABLE 9

| Name | Abbreviation | Boiling point [° C.] | Number of carbon atoms |
|---|---|---|---|
| 1,2-Pentanediol | PeG | 207 | 5 |
| 1,2-Hexanediol | HG | 250 | 6 |
| 1,2-Octanediol | OG | 197 | 8 |
| 1,2-Nonanediol | NG | 206 | 9 |

[Evaluation 3]

With regard to each of the obtained inks (I-13) to (I-15), the image density and the abrasion resistance of a formed image and nozzle clogging were evaluated by using the same method as the method for the evaluation of the inks (I-1) to (I-3). Table 10 below illustrates evaluation results. Table 10 below also illustrates evaluation results of the ink (I-3).

TABLE 10

| Ink | | I-13 | I-14 | I-3 | I-15 |
|---|---|---|---|---|---|
| Penetrant | Type | PeG | HG | OG | NG |
| | Number of carbon atoms | 5 | 6 | 8 | 9 |
| Evaluation | Image density | 1.2 (A) | 1.2 (A) | 1.3 (A) | 1.3 (A) |
| | Nozzle clogging | A | A | A | A |
| | Abrasion resistance | B | A | A | B |

As illustrated in Tables 9 and 10, the inks (I-3) and (I-14) included specific alkanediol having 6 or more and 8 or less carbon atoms as a penetrant. The inks (I-3) and (I-14) suppressed the occurrence of nozzle clogging and had good image density and abrasion resistance of formed images.

The ink (I-13) contained alkanediol having 5 or less carbon atoms as a penetrant. The ink (I-15) contained alkanediol having 9 or more carbon atoms as a penetrant. As a result, the inks (I-13) and (I-15) had poor abrasion resistance of a formed image.

According to the results of the inks (I-3) and (I-13) to (I-15), it is determined that, when specific alkanediol having 6 or more and 8 or less carbon atoms is used as a penetrant, the abrasion resistance of a formed image may be improved.

In summary, in the ink, the binder resin includes a self-emulsification specific resin, the specific resin includes the first repeating unit of 6.0% by mass or more and 20.0% by mass or less, and the penetrant includes specific alkanediol having 6 or more and 8 or less carbon atoms; thus, it is determined that the occurrence of nozzle clogging may be suppressed and the image density and the abrasion resistance of a formed image may be improved.

The ink according to the present disclosure may be used to form an image.

What is claimed is:

1. An ink-jet ink comprising:
   pigment particles;
   a binder resin; and
   a penetrant, wherein
   the binder resin includes a self-emulsification specific resin,
   the specific resin includes a first repeating unit derived from a specific alkyl ester (meth)acrylate including a straight-chain alkyl group having 9 or more and 15 or less carbon atoms,
   in the specific resin, a content ratio of the first repeating unit is 6.0% by mass or more and 20.0% by mass or less, and
   the penetrant includes specific alkanediol having 6 or more and 8 or less carbon atoms, and a content ratio of the penetrant is 0.3% by mass or more and less than 1.0% by mass.

2. The ink-jet ink according to claim 1, wherein the specific resin includes a second repeating unit derived from a compound including a glycidyl group and a (meth)acryloyl group.

3. The ink-jet ink according to claim 1, wherein
   the specific alkyl ester (meth)acrylate includes lauryl (meth)acrylate or myristyl (meth)acrylate.

4. The ink-jet ink according to claim 1, wherein the specific alkanediol includes 1,2-Hexanediol or 1,2-Octanediol.

5. The ink-jet ink according to claim 1, wherein the specific resin forms a pseudo film on a recording medium, and a content ratio of the specific resin in the binder resin is 80% by mass or more.

\* \* \* \* \*